United States Patent
Siegal et al.

[19]

[11] Patent Number: 5,967,820
[45] Date of Patent: Oct. 19, 1999

[54] ELECTRICAL SYSTEM FOR USE WITH GANGED FURNITURE

[75] Inventors: Burton L. Siegal, Skokie, Ill.; Scott Schwinghammer; David R. Gutgsell, both of Jasper, Ind.

[73] Assignee: Ditto Sales, Inc., Jasper, Ind.

[21] Appl. No.: 09/056,442

[22] Filed: Apr. 7, 1998

[51] Int. Cl.$^6$ .................................................. H01R 4/60
[52] U.S. Cl. ............................................................ 439/214
[58] Field of Search .................................. 439/215, 209, 439/210, 211, 212, 213, 214, 110, 111, 112, 113, 114, 115, 116, 117, 118, 119, 120, 147

[56] References Cited

U.S. PATENT DOCUMENTS

| | | |
|---|---|---|
| 2,072,703 | 3/1937 | Beersman .................................. 439/120 |
| 3,433,886 | 3/1969 | Myers . |
| 3,622,684 | 11/1971 | Press . |
| 3,646,244 | 2/1972 | Cole . |
| 3,794,956 | 2/1974 | Dubreuil . |
| 4,370,008 | 1/1983 | Haworth et al. . |
| 4,511,198 | 4/1985 | Mitchell et al. . |
| 4,551,577 | 11/1985 | Byrne . |
| 4,747,788 | 5/1988 | Byrne . |
| 4,792,881 | 12/1988 | Wilson et al. . |
| 4,828,513 | 5/1989 | Morrison et al. . |
| 5,024,614 | 6/1991 | Dola et al. . |
| 5,152,698 | 10/1992 | Juhlin et al. ............................ 439/215 |
| 5,203,711 | 4/1993 | Bogiel ..................................... 439/215 |
| 5,203,712 | 4/1993 | Kilpatrick et al. ...................... 439/215 |
| 5,230,552 | 7/1993 | Schipper et al. . |
| 5,252,086 | 10/1993 | Russel et al. ........................... 439/215 |
| 5,351,173 | 9/1994 | Byrne . |
| 5,451,101 | 9/1995 | Ellison et al. . |
| 5,674,194 | 10/1997 | Domigan ................................. 307/147 |

Primary Examiner—Gary Paumen
Assistant Examiner—Alexander Gilman
Attorney, Agent, or Firm—Beck, Michael & Beck, P.C.

[57] ABSTRACT

An electrical system for use with interconnected or ganged furniture includes electrical receptacles for each article of furniture and a plurality of electrical cables for connecting the receptacles. The receptacles and cables have specifically coded terminal groups and connector terminal groups that prevent interconnection of more than a specific allotted number of receptacles. An initial receptacle includes a substantially permanent power cord for plugging into a conventional wall socket. A last receptacle has only an input terminal group and a blank output. Intermediate receptacles are provided so that the total electrical system is limited to twelve sockets among the first, last and intermediate receptacles. In one embodiment, five terminal groups are provided. The receptacles are configured so that the input and output terminal groups for the receptacle are different. In this embodiment, only three electrical cable configurations are required, two having different mating terminal groups the mating ends and one having the same terminal groups at its ends.

9 Claims, 8 Drawing Sheets

Fig. 14D though the table arrangement

ELECTRICAL SYSTEM FOR USE WITH GANGED FURNITURE

BACKGROUND OF THE INVENTION

With the increased use of personal computers in the office environment, many articles of furniture have been modified to accommodate the proliferation of electrical cables associated with these computers. The task of wire management has become more troublesome, yet more essential. Many furniture systems have been developed that provide some means for storing or containing the various cables and wires associated with a computer system, as well as with other electrical equipment that may be supported by an article of furniture, such as a table or a desk.

A more unique problem arises in the case of ganged or interconnected furniture. For example, in many conference or training room settings, several tables can be connected or ganged together in a particular arrangement. In a training setting, several trainees may be seated around an array of tables, each trainee having his/her own computer for performing various training tasks. Similarly, in a conference room setting, the attendees may likewise require their own P.C. at their particular location at the table arrangement.

With ganged furniture of this type, such as in a conference or training room scenario, a problem arises as to how to get electrical power to each of the computers throughout the length of the connected furniture. One obvious approach is to provide each work station or conference table location with an electrical cable connected directly to an outlet. However, in most conference or training rooms, there are not enough wall outlets to accommodate the number of participants. A further option that has been pursued is the utilization of a plurality of so-called "power strips," which are simply strips of multiple electrical outlets connected to a single power cord, which is in turn plugged into a wall socket. This approach has the advantage of reducing the number of wall plug ins that are necessary, since a typical power strip will have 4–8 electrical sockets. Nevertheless, in a conference room setting where there are a dozen or more participants, several power strips would be required, which again is likely to exceed the number of available wall outlets. Moreover, even if there are a sufficient number of wall outlets, the use of several power strips can still lead to a tangled web of electrical cables that somehow always manage to get into the path of a participant who will either trip over a cable or inadvertently unplug it from the wall socket.

In some circumstances, the power strips are improperly daisy chained together. In other words, each power strip is connected to a prior power strip, which is ultimately connected to a single wall socket. This use of the power strip is in violation of certain regulatory standards, as well as the usage recommended by the manufacturers of power strips. Notwithstanding the safety hazards, the daisy chaining of power strips still presents problems in wire management.

Therefore, there still remains a need for an electrical system that can be readily adapted for use with ganged articles of furniture, such as training or conference tables. The answer to this need is complicated by various safety regulations promulgated by the National Electric Code (NEC). One principal regulation limits the number of electrical outlets that are connected together. According to NEC regulations, a single electrical circuit is limited to a wall outlet and twelve additional outlets. An Underwriter's Laboratory regulation requires the use of a circuit breaker if more than three outlets are electrically connected to a 15-amp circuit. Other UL regulations limit the length of flexible power cords that can be used in a particular system, and the use of permanent vs. temporary electrical taps.

Adherence to the National Electric Code is an almost universal requirement of local government building inspector bodies. A UL or equivalent listing is often a requirement for electrical equipment by many of those same inspecting bodies. Consequently, purchasers of "electrified" articles of furniture will look to adherence to these regulations as a requirement for their purchase. Thus far, no adequate solution has been proposed for an electrical power distribution system that is adapted for use with ganged articles of furniture. While various solutions may exist that would fall within the UL restrictions, none of these possible solutions are fool proof. Specifically, there has been no answer to the problem of electrified ganged furniture that would prevent the improper use of the furniture. For example, simply providing a power strip with each table could satisfy the need for electrical power at a number of stations at the table. However, the user of the ganged furniture could improperly daisy chain the power strips between adjacent connected tables.

Consequently, not only is there a need for an electrical system that can be used with ganged furniture, there is also a need for such a system that prevents unauthorized or improper usage.

SUMMARY OF THE INVENTION

To address these needs, the present invention contemplates an electrical system for use with ganged articles of furniture that meets all of the NEC and UL requirements and that prevents improper daisy chaining of furniture and electrical outlets. In one embodiment, the system includes a plurality of electrical receptacles with at least one receptacle being mounted within each article of furniture. Each of the plurality of receptacles has at least one, and preferably two, electrical sockets to provide electrical power to at least two devices, such as a PC and monitor. In one aspect of the invention, the first receptacle in the first table has a power cord that is permanently electrically connected to the receptacle, and that is adapted to plug in to a standard wall socket. The initial receptacle also has an initial terminal group for making a removable electrical connection to a subsequent one of the plurality of electrical receptacles.

In a further feature of the invention, the electrical system includes a last receptacle that is mounted in the last of the ganged articles of furniture. This last receptacle includes only a single terminal group for making a removable electrical connection with a previous one of the plurality of electrical receptacles. Most preferably, the last receptacle is of the same design as the initial receptacle except that it includes a blank end where a second terminal group would otherwise be disposed.

The present invention the then contemplates at least one intermediate receptacle mounted with a separate article of furniture. This intermediate receptacle has a first terminal group at its input end and a second terminal group at its output end, each of the terminal groups being adapted to make a removable electrical connection with another one of the plurality of electrical receptacles. For example, when only one intermediate receptacle is being utilized, the first terminal group provides a removable electrical connection with the initial terminal group with the first or initial receptacle. Likewise, the second terminal group of the intermediate receptacle makes a removable electrical connection with the last terminal group of the last receptacle.

In still a further aspect of the invention, a plurality of electrical cables are provided for making the removable electrical connections between the plurality of receptacles. The electrical cables have a first connector end and an opposite second connector end that are each specifically configured for mating connection only with a certain terminal group. For example, in the system utilizing only an initial receptacle, a last receptacle and one intermediate receptacle, one electrical cable is provided that has one connector end configured for mating with the initial terminal group and a second connector end configured for mating with the first terminal group of the intermediate receptacle. A second electrical cable is also provided that has a first connector end for mating with the second terminal group of the intermediate receptacle and an opposite connector end configured for mating with the last terminal group of the last receptacle. With this configuration, the inventive electrical system cannot be put together in a manner that would violate the NEC or UL codes. The restriction on the composition of the terminal groups of the various electrical receptacles, as well as the connector ends of the electrical cables, prevents additional receptacles from being added to the system.

In the most comprehensive system, six electrical receptacles, each having two electrical sockets or outlets, are connected together with the ganged articles of furniture. The receptacles and intermediate electrical cables are again configured so that additional receptacles, and therefore additional sockets, cannot be added to the system. In this embodiment, the initial receptacle and last receptacle are as described above. Four intermediate receptacles are provided in which the combination of the first terminal group and the second terminal group for each of the receptacles are unique to that receptacle. In addition, for one intermediate receptacle, the first terminal group has a different configuration than the second terminal group so that the same end of a given electrical cable cannot be plugged into both terminal groups.

In a further feature of this embodiment, the plurality of electrical cables are configured for mating between the terminal groups of adjacent receptacles. In one feature of this embodiment, the plurality of receptacles are arranged in mirror image, with the first three receptacles having a particular arrangement of terminal groups, and the last three receptacles having the mirror image of that same arrangement of terminal groups. In this manner, one aspect of the invention is realized in which six receptacles can be connected to provide twelve electrical outlets, but only two different types of intermediate receptacle terminal groups and three different types of electrical cables are required to achieve this arrangement.

In a further aspect of the invention, the electrical system contemplates the use of a plurality of electrical receptacles and a plurality of electrical cables with the terminal groups and mating connector ends being configured so that no more than twelve electrical sockets can be connected together at one time. In one embodiment, this restriction is achieved by limiting the electrical receptacles to only those receptacles in which the two terminal groups providing input and output to the receptacle are not interchangeable. This restriction is further accomplished by requiring only one electrical cable be utilized in which its mating ends are configured for connection with the same type of terminal group. All other cables must have different mating ends.

In another embodiment, the system contemplates only one electrical receptacle having input and output terminal groups that are interchangeable, with the remaining receptacles having different terminal groups. In this embodiment, no electrical cables are provided that have opposite connector ends that can be engaged to the same terminal group. In all of the embodiments, the user of the ganged furniture cannot connect together more than the allotted number of electrical receptacles and outlets.

It is therefore one object of the present invention to provide an electrical system that can be readily used with ganged articles of furniture. A further object is to provide such a system that can be electrically connected by using a plurality of specially coded electrical cables for mating with similarly coded terminal groups in each of the receptacles.

Another object of the invention is to restrict the user of the ganged furniture from daisy chaining additional electrical receptacles that might exceed approved configurations. This object is achieved in the present invention by a system that can be readily connected and disconnected as the articles of furniture are ganged or uncoupled.

Other objects and specific benefits of the present invention will become obvious upon consideration of the following written description and accompanying figures.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention contemplates an electrical system for use with ganged articles of furniture, such as conference or training tables. According to the illustrated embodiments, the inventive electrical system can be easily connected and disconnected between ganged tables. Moreover, the electrical system is configured with electrical receptacles and interconnecting cables so that no more than a permissible number of outlets can be connected together. In this manner, a particular arrangement of ganged tables and their associated electrical system can be provided so that the user cannot violate various code restrictions concerning the number of receptacles that can be powered from of a single connection to a conventional wall socket.

Figure 1:
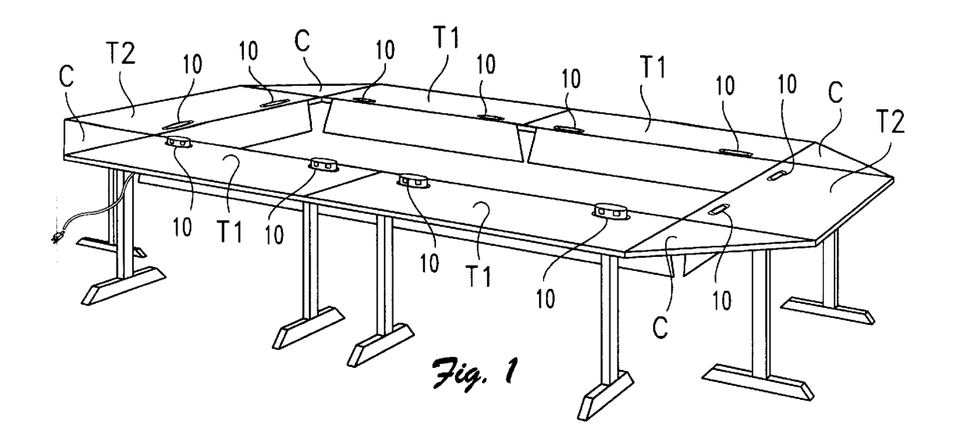
FIG. 1 is perspective view of an arrangement of ganged electrified tables in a training room facility.

In accordance with one embodiment of the invention, the electrical system is adapted for use with an arrangement of ganged articles of furniture, such as tables T1 and T2 shown in FIG. 1. the tables are shown in the form of a closed rectangle, such as might arise in a training scenario. The tables are interconnected at the corners by corner pieces C. In this arrangement, the tables T1 can have a length of eight feet, while the end tables T2 can be shorter, with a length of six feet. Of course, a variety of arrangements and sizes are contemplated by the present invention, with the arrangement of FIG. 1 being simply illustrative of ganged articles of furniture.

In accordance with the inventive electrical system, each table is provided with one or more electrical receptacles 10. In the illustrated embodiment, the receptacles are extendable from the tops of the tables T1, T2. Each of the electrical receptacles 10 includes at least one socket 21 or outlet for providing power to an electrical device supported on the table. In the following illustrated embodiments, the electrical receptacles 10 include two such sockets, although other socket arrangements are contemplated. Moreover, although the present disclosure discusses a relocatable and extendable receptacle 10, a fixed receptacle can also be employed within the spirit of the present invention. For example, each table can have one or two outlets at a fixed position on or beneath the table.

Figure 2:
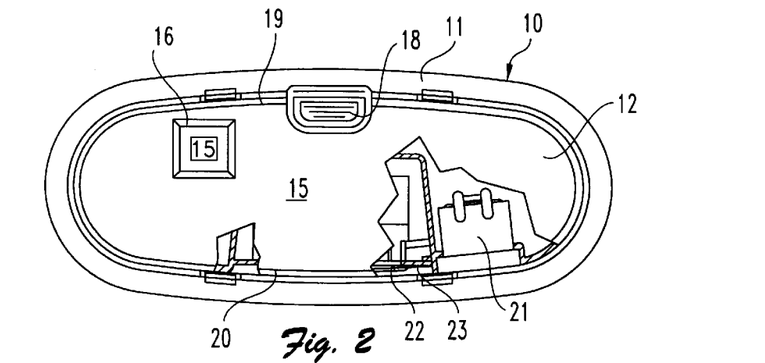
FIG. 2 is a top elevational view of an extendable electrical receptacle utilized with the ganged tables shown in FIG. 1.
Figure 3:
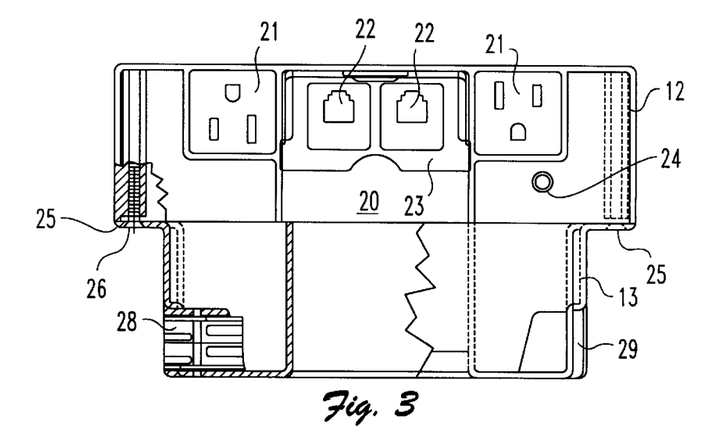
FIG. 3 is a side elevational partial cut-away and cross-sectional view of the extendable electrical receptacle shown in FIG. 2.

In accordance with the preferred embodiment, the extendable electrical receptacle 10 includes a bezel 11, an upper portion 12 and a lower portion 13, as depicted in FIGS. 2 and 3. The upper portion 12 includes a top plate 15 that can carry a circuit breaker designation 16. In the illustrated embodiment, the designation 16 indicates that a 15-amp circuit breaker is situated within the particular electrical receptacle 10. It is contemplated that in accordance with the present invention the first of the electrical receptacles in the ganged articles of furniture will include such a circuit breaker, while the remaining receptacles will have neither a circuit breaker nor the designation 16.

The extendable receptacle 10 includes a release tab 18 on the upper portion 12 to releasably engage the upper portion 12 to the bezel 11. The upper portion also includes an outer wall 20 into which is formed a pair of electrical sockets 21. In addition, the receptacle 10 can also include data or phone jacks 22 supported on a mounting plate 23. In this way, the electrical receptacle 10 can not only provide electrical power to a computer, for instance; it can also provide a data connection or telephone link as necessary for the user. The receptacle can also include a pilot light 24 in the upper portion 12 to show that the electrical system is energized.

The lower portion 13 is engaged to the upper portion 12 at an attachment flange 25. A plurality of attachment screws 26 is provided to connect the two portions after all of the electrical components have been assembled within the receptacle 10. At the base of the lower portion 13 are opposite input and output terminal openings 28 and 29. These terminal openings will receive input and output terminal groups, as discussed in more detail herein.

Figure 4:
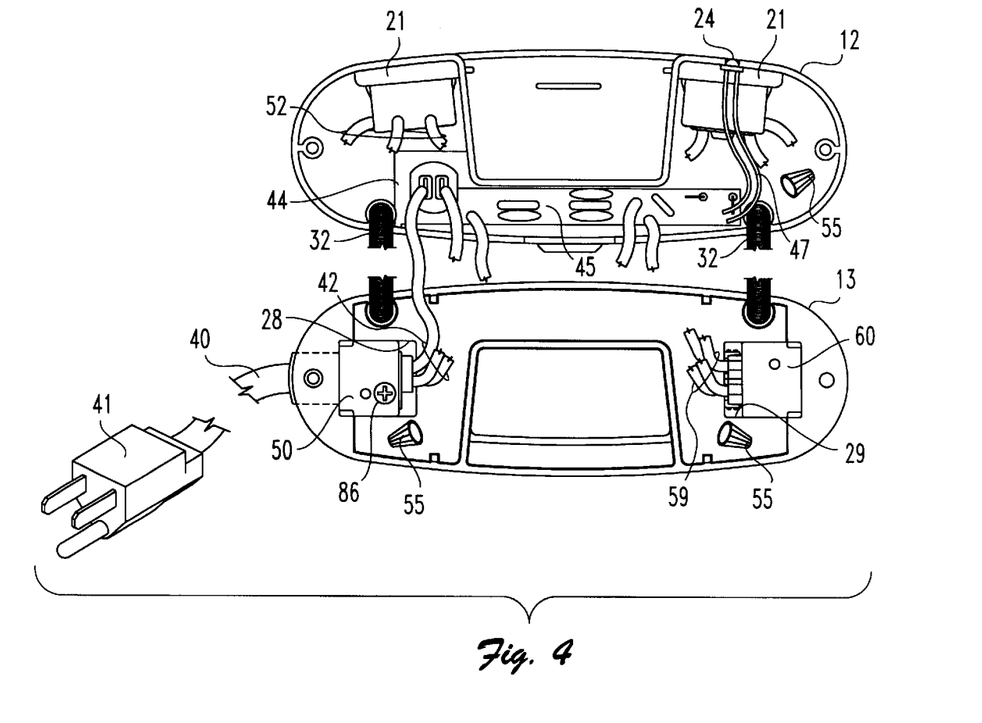
FIG. 4 is an exploded view of the electrical receptacle in FIGS. 2 and 3, with the upper and lower portions exposed showing the electrical connections within the receptacle.
Figure 5:
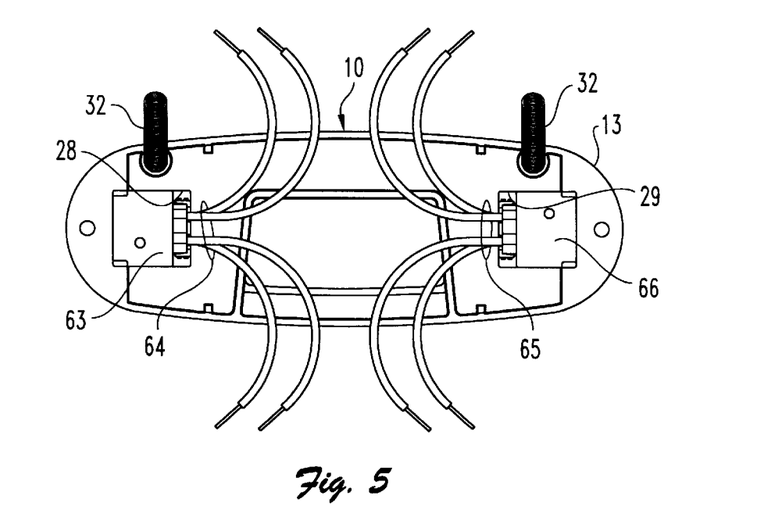
FIG. 5 is a top elevational view of a bottom portion of one receptacle according to the present invention.

In accordance with the present embodiment, the extendable electrical receptacle 10 includes a pair of compression springs 32 that are best seen in FIGS. 4 and 5. These compression springs are used to push the receptacle up out of the bezel 11 upon release of the tab 18. Additional details of the extendable receptacle 10 according to the illustrated embodiment can be found in co-pending U.S. patent application Ser. No. 09/056,414, entitled "Extendable Temporary Electrical Receptacle", filed on Apr. 7, 1998 and owned by the assignee of the present invention.

Referring now to FIGS. 4 and 5, arrangements of the electrical receptacles 10 according to the present invention are depicted. In FIG. 4, an initial electrical receptacle is illustrated—i.e., the first receptacle in the connected chain of electrical receptacles. In this initial receptacle, a power cable 40 is substantially permanently connected to the receptacle. The power cable includes a plug 41 that is adapted for engagement with a standard wall socket. The cable also includes a plurality of wires 42, such as power and ground wires, that extend into the body of the electrical receptacle 10. In this initial receptacle, the hot lead of the wires 42 is connected through a circuit breaker 44. In a specific embodiment, the circuit breaker can be a 15-amp breaker, as is required by certain UL regulations. In another specific embodiment, a surge protector 45 is used in the first or initial electrical receptacle only. An indicator wire 47 connects the surge protector to the pilot light 24 on the outer wall 20 of the upper portion 12 of the receptacle. Thus, when the power cable 40 is plugged into a wall outlet, and power is provided to the electrical receptacle 10, the pilot light will provide an indication of this connection and that the surge protector is still functioning.

The power cable 40 is engaged to the electrical receptacle 10 by way of a strain relief cable clamp 50. This strain relief clamp is fixed about the power cable 40 and is adapted to be press fit or secured with a screw 86 within the terminal opening 28 of the initial electrical receptacle 10. Details of this particular strain relief cable clamp 50 are, again, illustrated in the above identified co-pending application Ser. No. 09/056,414. It is understood, though, that other strain relief cable clamps can be utilized to prevent damage to and exposure of the wires 42 of the power cable 40.

Each of the electrical receptacles 10 includes a pair of electrical sockets 21. Each of the sockets includes socket wires 52 that are connected to the wires 42 of the power cable 40. The electrical receptacle 10 is provided with a number of wiring caps 55 to cover and electrically protect the twisted engagement between the socket wires 52 and the cable wires 42.

In accordance with the present invention, each electrical receptacle 10 is provided with output wires 59 that are engaged to a particular terminal group. In the initial electrical receptacle 10, the output wires 59 are engaged to a first or initial terminal group 60 that is mounted within the opposite or output terminal opening 29. In this initial electrical receptacle, power provided through the power cable 40 directly energizes both the electrical sockets 21 and the output wires 59. In this manner, additional electrical receptacles can be electrically connected to the initial receptacle.

One such additional electrical receptacle is shown in FIG. 5. The representation in FIG. 5 is for an intermediate electrical receptacle 10' according to the present inventive system. In this receptacle, an intermediate input terminal group 63 is mounted within the terminal opening 28 at one side of the receptacle. An intermediate output terminal group 66 is mounted within the terminal opening 29 at the opposite side of the receptacle. The input terminal group 63 includes a plurality of internal input wires 64 that are used to provide electrical power to each of the sockets (not shown) mounted within the intermediate receptacle. Moreover, the internal input wires 64 are in electrical contact with internal output wires 65 that transmit power directly to the output terminal group 66. Thus, electrical power from the initial electrical receptacle (at the power cable 40) is not only provided directly to the electrical sockets at the intermediate receptacles, but also passed directly through the intermediate receptacle for providing power to subsequent receptacles connected to the particular intermediate receptacle.

Figure 6:
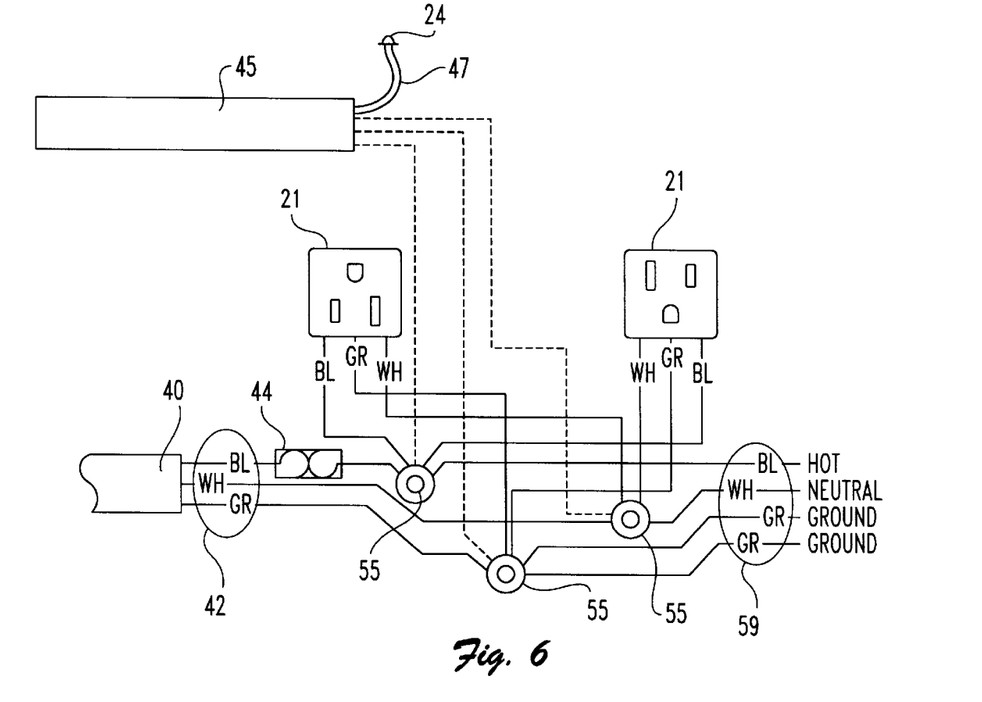
FIG. 6 is an electrical schematic showing the electrical connection within a first or initial receptacle according to one embodiment of the present invention.

These various electrical interconnections within each of the receptacles are depicted in FIGS. 6–9. The internal electrical connections for the initial receptacle are shown in FIG. 6. In this figure, it can be seen that the power cable 40 and its plurality of wires 42 are engaged to each of the electrical sockets 21, to the surge protector 45 and to the output wires 59. The hot wire of the wires 42 preferably first pass through a circuit breaker 44. The wiring caps 55 insulate the twisted bare wires making the various electrical connections within the receptacle. As can be seen in FIG. 6, while the power cable 40 includes a single ground wire, the output wires 59 for the initial electrical receptacle include a second ground wire. This additional ground wire and its associated contacts is provided as a means to produce a very low resistance ground path and functions as part of a set of coded terminal groups, as discussed in more detail herein. In another embodiment, this added ground terminal location can be replaced with a non-conducting keying terminal.

Figure 7:
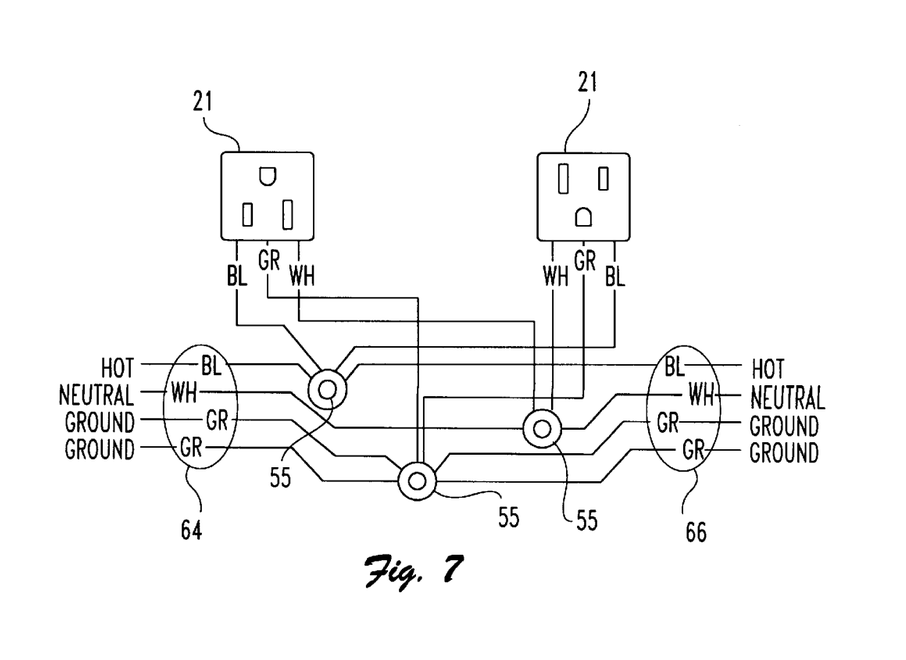
FIG. 7 is an electrical schematic showing the electrical connections within an intermediate extendable receptacle according to the preferred embodiment of the invention.

FIG. 7 shows a typical intermediate electrical receptacle 10' for use with the electrical system of the present invention. In this arrangement, the internal input wires 64 are connected to each of the sockets 21, as well as to the internal output wires 65. Again, both the input wires 64 and the output wires 65 include the additional ground wire.

Figure 8:
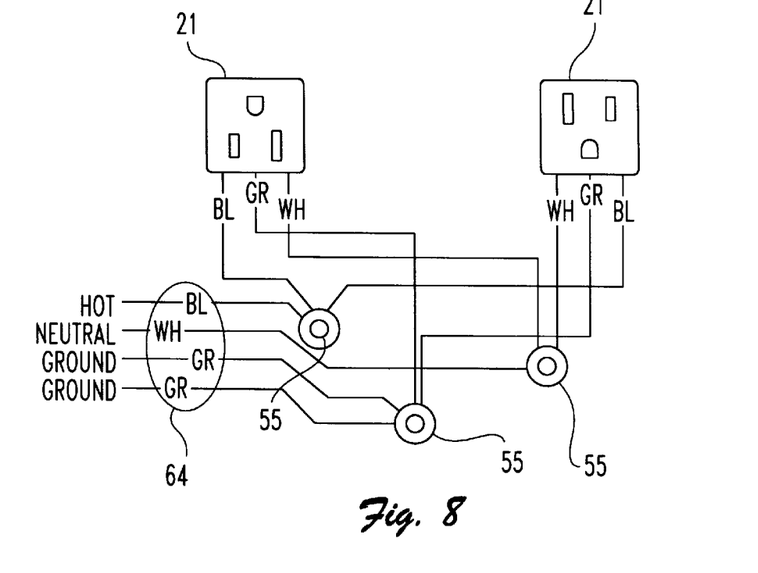
FIG. 8 is an electrical schematic of the electrical connections within a last receptacle according to the present embodiment.
Figure 9:
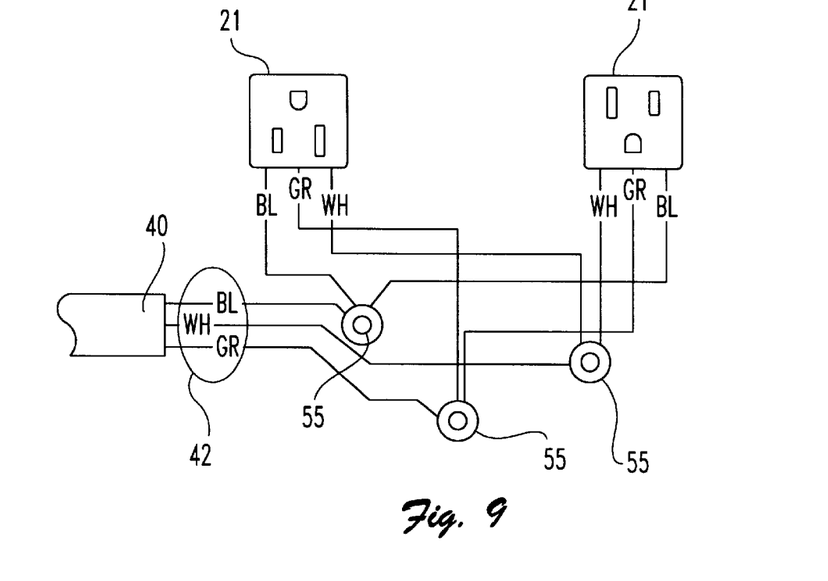
FIG. 9 is an electrical schematic showing a contrasting electrical connection within an initial electrical receptacle that is used alone without the need to communicate electrical power to other electrical receptacles.
Figure 10A:
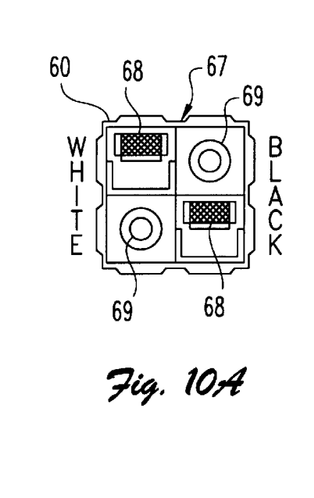
FIG. 10 is an end view of five configurations of terminal groups for use with the electrical system according to one embodiment of the present invention for providing six receptacles and twelve outlets to an arrangement of ganged articles of furniture.
Figure 10B:
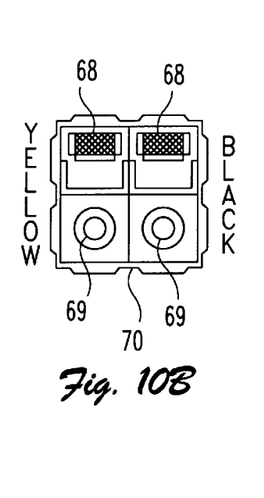
Figure 10C:
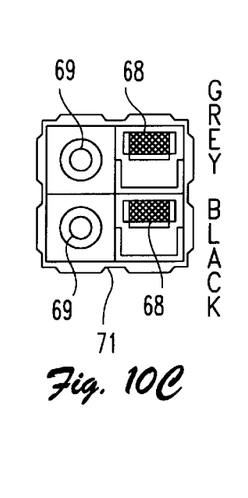
Figure 10D:
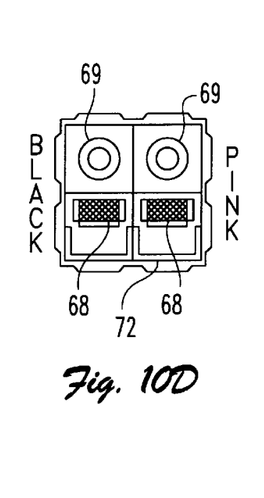
Figure 10E:
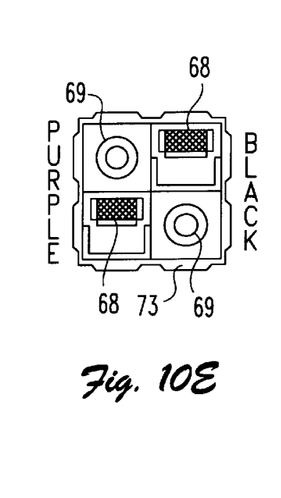

The electrical diagram of FIG. 8 shows the internal connections for the last electrical receptacle for the inventive system. In this last receptacle, only power input is accepted, at the first or input terminal opening 28. The opposite or output terminal opening 29 is preferably covered by a blank to prevent connection to additional cables. In this last electrical receptacle, it can be seen that the internal input wire 64 is directly connected to each of the sockets 21. No internal output wires are provided. For comparative purposes, the internal electrical wiring for a standard receptacle is shown in FIG. 9. In this standard arrangement, the power cable 40 terminates in connections to each of the electrical sockets 21, with no output wiring connection, as found in the circuit diagram of FIG. 6.

Referring now to FIG. 10, one important aspect to the present invention is illustrated. Specifically, the present invention contemplates coded arrangements of terminal groups to limit the types of connections that can be made between receptacles on ganged articles of furniture. With these coded terminal groups, the present invention prevents a user from stringing together more than the allotted number of electrical receptacles or sockets. These coded terminal groups are used in conjunction with specifically provided electrical cables to achieve this important function.

In the illustration of FIG. 10, five such terminal groups A–E are illustrated. In accordance with the preferred embodiment of the present invention, these five terminal groups are used to provide connection between six electrical receptacles 10, 10', each having a pair of electrical sockets 21. In this preferred embodiment, twelve electrical sockets are connected in the electrical system, which meet, but do not exceed, the NEC and UL requirements for systems of this type. Of course, fewer terminal groups can be utilized if fewer electrical sockets are to be included in a particular system.

In each of the terminal groups A–E, a pair of power pins 68 and a pair of ground pins 69 are provided. The power pins 68 specifically include a hot pin and a neutral pin, in accordance with standard AC wiring procedures. In the preferred embodiment, the initial terminal group 67 (group A) orients the power pins 68 on the diagonal. In the type B terminal group 70, the power pins are both arranged at the top of the grouping. In the terminal group 71, corresponding to group C, the power pins are both disposed at the right side, while in the terminal group 72 (group D) the power pins are at the bottom of the grouping. Finally, the terminal group 73, corresponding to group E, locates the power pins 68 are on the diagonal, but in an opposite orientation with respect to the initial terminal group 67.

In accordance with the specific embodiment, each of the terminal groups can be commercially available Anderson "POWERPOLE" contact blocks with 45 amp contacts and 14 gauge wire. Each of the contact blocks or terminal groups 67 and 70–73 include dual 10 amp first make, last break ground pins 69. The color designations shown adjacent the terminal groups in FIG. 10 are intended to assist the user to quickly identify the desired terminal group.

It is understood that the various terminal groups 67 and 70–73 are mounted within corresponding terminal openings 28, 29. Each of these terminal groups is engaged to either internal input wires 64 or internal output wires 65 disposed with each of the electrical receptacles 10', depending upon which one of the terminal openings 28, 29 the terminal groups are situated within.

Figures 11, 12:
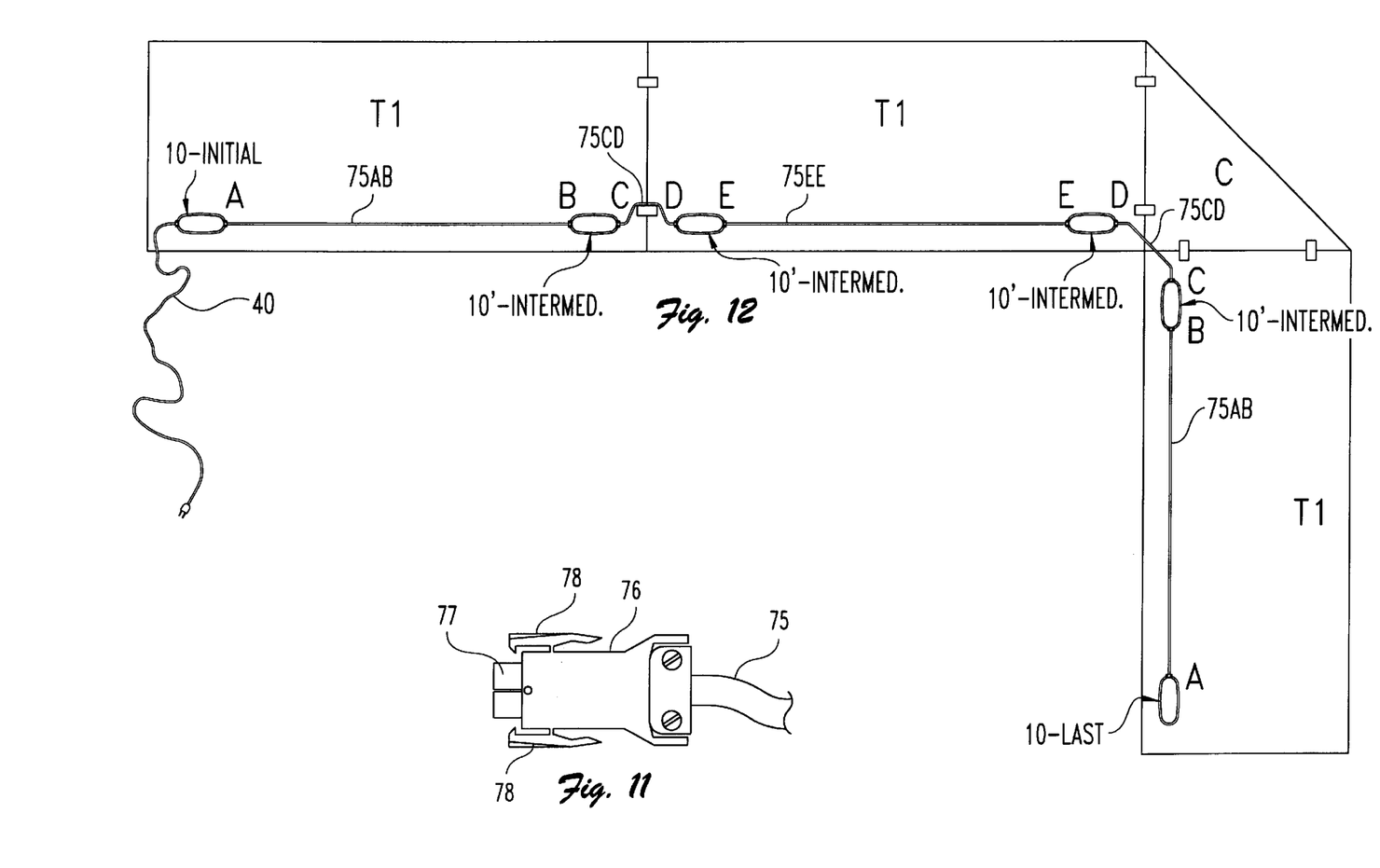
FIG. 11 is a top elevational view of a connector end for one of the plurality of electrical cables utilized according to a preferred embodiment of the present invention.
FIG. 12 is a top elevational view showing an arrangement of six electrical receptacles having two outlets each, providing an electrical system for a ganged arrangement of three tables.

The specifically coded terminal groups form an essential part of the present invention, in conjunction with specifically configured ganging cables 75, as shown in FIG. 11. In the preferred embodiment, the ganging cables 75 include a connector end 76 with a mating terminal group 77 at each end. The mating terminal group 77 at the opposite ends of the ganging cable 75 are also specifically coded to provide connection between limited ones of the electrical receptacles 10. The ganging cable 75 also includes retaining latches 78 on the connector end 76, that can latch into corresponding recesses in the electrical receptacles 10 at either of the terminal openings 28, 29. Preferably, the ganging cables 75 are configured with retaining latches 78 only at one end of the cable. The opposite connector of the cable can form a press or friction fit with mating the terminal opening 28, 29 of the electrical receptacle. In this way, neither the cable 75 nor the receptacles 10, 10' connected at either end of the cable are damaged if a table is disconnected from another table prior to disconnection of the electrical components. In this respect, the ganging cable can provide its own strain relief feature.

The use of the ganging cables 75 and the various terminal groups A–E are illustrated in FIG. 12. In this figure, three tables T1 are interconnected, with an additional corner piece C at a right angle junction between two tables. In the illustrated arrangement, an initial electrical receptacle 10-initial is provided at one end that includes the substantially permanently engaged power cable 40. At the opposite end of the ganged tables, an electrical receptacle 10-last is provided which has a single input and no output. In this last receptacle, a blank can be engaged within the second terminal opening 29 so that additional electrical connection cannot be attempted. This last electrical receptacle 10-last includes a wiring arrangement as shown in FIG. 8. Similarly, the initial receptacle 10-initial includes a wiring arrangement as illustrated in FIG. 6.

In the illustrated embodiment, four intermediate electrical receptacles 10'-intermediate are provided, each having a wiring arrangement as shown in FIG. 7. In this figure, the terminal groups contained within each of the receptacles are identified by their letter designation, namely groups A–E. It is of course understood that terminal group A corresponds to group 67 in FIG. 10, while groups B–E correspond to groups 70–73, respectively, in the same figure.

In accordance with the present invention, the initial electrical receptacle 10-initial includes the fixed power cable 40 at one end and the terminal group A at the opposite end. The first intermediate receptacle includes a terminal group B at its input terminal opening 28, and a terminal group C at its output terminal opening 29. The next adjacent intermediate receptacle 10' has terminal groups D and E at its respective input and output openings 28, 29. The next adjacent intermediate receptacle 10' also includes terminal groups D and E; however, this intermediate receptacle is reversed so that its input group is the group E while its output group is group D. The final intermediate receptacle 10' has a terminal group that is the same as the first, namely including terminal groups B and C; but like the immediately prior group this receptacle is also reversed from the first intermediate receptacle. Finally, the last receptacle 10-last includes only an input terminal group A at its first opening 28.

Further in accordance with the present invention, a number of electrical ganging cables 75 are provided. Preferably, these ganging cables are flexible cables. As can be seen in FIG. 12, only three different ganging cables are required. The first and last ganging tables 75AB provide connection between the terminal group A and the terminal group B. A second cable 75CD similarly provide connection between terminal groups C and D, while the final ganging cable 75EE connects the terminal groups E between the two middle intermediate receptacles 10'. It should be understood that none of the cables 75AB, 75CD and 75EE, can be interchanged with any of the other cables. Specifically, the cable 75AB cannot be connected in place of the cables 75CD or 75EE because its mating terminal groups do not correspond to the input and output terminal groups of the intermediate electrical receptacles. The same holds true for the cable 75CD relative to the cable 75EE.

When a consumer purchases an electrical system according to FIG. 12 for use with ganged tables, only the specific illustrated components are provided. Thus, there is no risk that the consumer will be able to interconnect any of these components improperly. Moreover, since only the specific types of ganging cables 75 are provided, there is no risk that the consumer can connect additional tables and receptacles to daisy chain further outlets onto the system depicted in FIG. 12.

Figure 13:
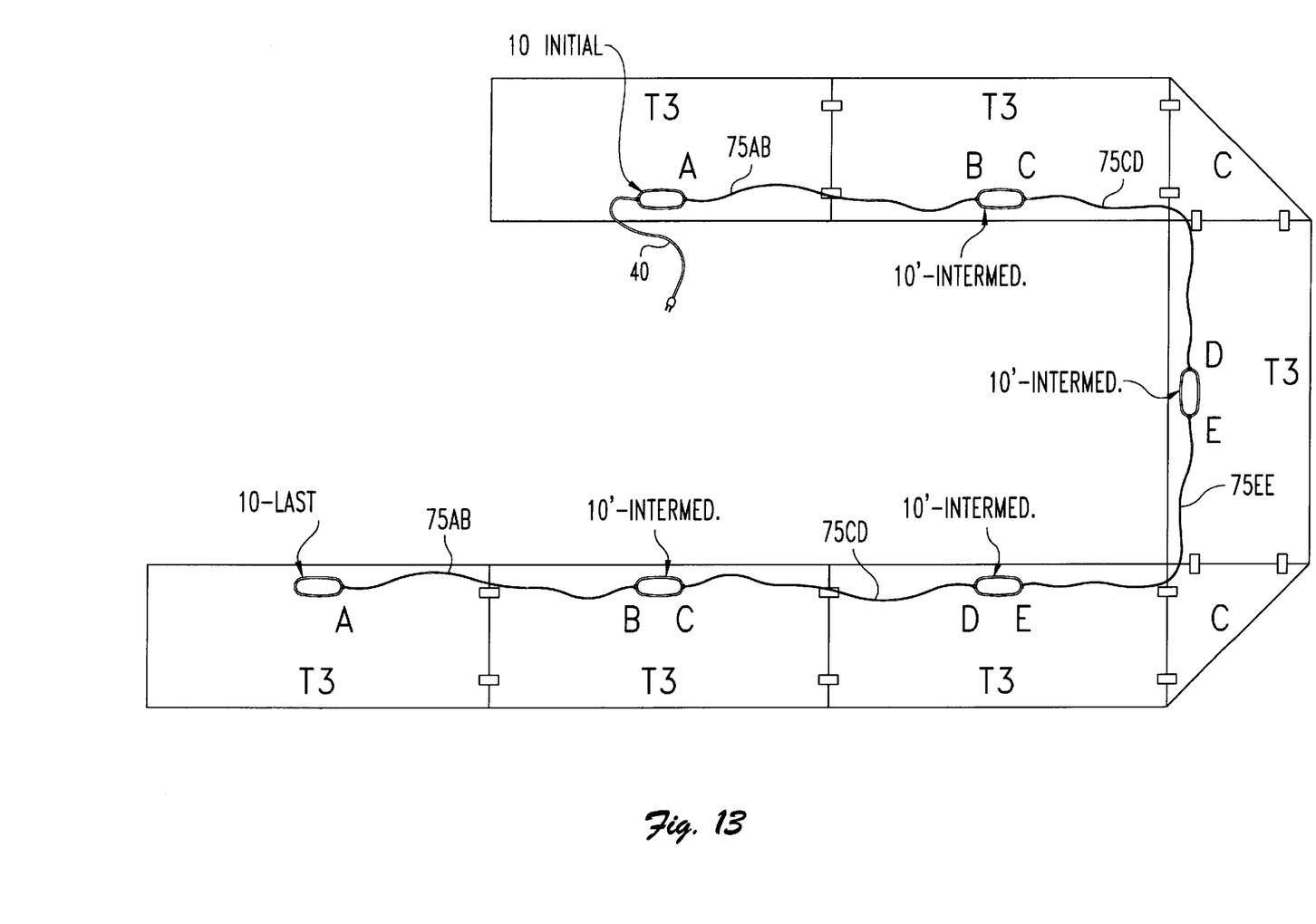
FIG. 13 is a top elevational view of an electrical system having six receptacles with two sockets each connected between six ganged tables.

Referring to FIG. 13, an arrangement of smaller tables T3 is shown. In this arrangement, each table T3 includes a single electrical receptacle 10, although each receptacle includes a pair of electrical sockets 21. As with the system shown in FIG. 12, the system of FIG. 13 includes a receptacle 10-initial with a power cable 40, and a final receptacle 10-last that has only an input connection. Each of these two receptacles includes a terminal group A at their respective output opening 29 and input opening 28. As depicted in the figure, the intermediate receptacles 10' include the following combination of terminal groups: BC; DE; ED; and CB. In order to provide electrical connection between each of the intermediate receptacles 10', a number of ganging cables 75 are provided, each having the following mating terminal groups: 75AB; 75CD; and 75EE. As with the previous arrangement, the arrangement of FIG. 13 includes two such cables 75AB, two cables 75CD and a single cable 75EE. With this particular arrangement of cables and terminal groups, it is not possible for a consumer to either improperly connect any of the receptacles or add additional receptacles beyond the NEC and UL regulations.

In accordance with a further aspect of the invention, the various cables 75 illustrated in FIGS. 12 and 13 can be provided in a variety of lengths. In the system shown in FIG. 12, the tables T1 are illustrated as eight feet long tables. In this instance, the ganging cables 75AB and 75EE must have a length sufficient to span the fixed location of the two electrical receptacles 10, 10' supported by the table T1. In the case of an eight-foot table, the ganging cables 75AB and 75EE have a length of approximately 72 inches. Of course, the length of the cable is also determined by the size of the two receptacles, and consequently the distance between the terminal openings 28, 29 in the receptacles. It is understood that tables of different lengths will naturally require cables of different lengths. For instance, a five foot long table can require a cable of approximately 36 inches long, while a six foot table requires a ganging cable, such as cable AB or cable EE of almost 48 inches long.

Since the cable CD is not required to span the length of tables in the arrangement of FIG. 12, it can have a length of as short as 12 inches. On the other hand, the cable CD when used in the arrangement of FIG. 13 must be longer since it spans between centrally located electrical receptacles in each of the tables T3. In this instance, the cable CD can have a length of approximately 36 inches, when the tables T3 are four-foot tables. The cables AB and EE can also have the same length dimension in the arrangement illustrated in FIG. 13.

In accordance with a further aspect of the present invention, the lengths of the ganging cables 75 can be established to provide further restriction to the ways in which the various electrical receptacles can be connected. For example, the cables 75CD can be limited to lengths less than the distance between electrical receptacles mounted on a single table. In this way, a consumer cannot improperly mount a receptacle having B and C terminal groups on the same table with a receptacle having D and E terminal groups.

The schematics in FIGS. 14A–D illustrate various aspects of the present invention. The schematic representation of FIG. 14A corresponds to the system illustrated in FIG. 12. As can be seen in the remaining arrangements, each includes an electrical receptacle 10-initial having a substantially permanent power input, and a final receptacle 10-last having only an input terminal group A and a blank at its output terminal opening 29.

Figures 14A, 14B, 14C, 14D:
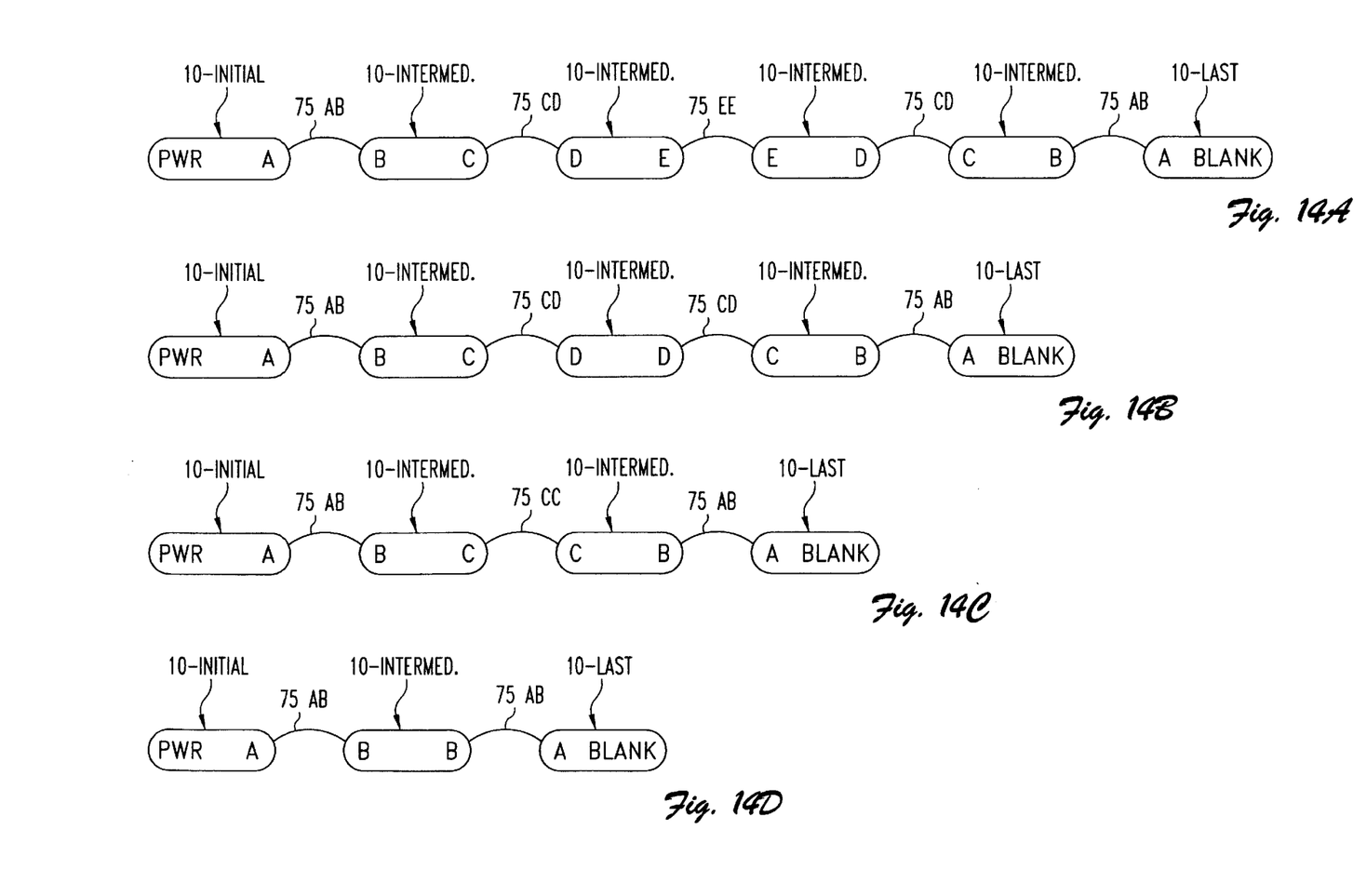
FIGS. 14A–14D are schematic presentations of configurations of receptacles and electrical cables according to various embodiments of the present invention.

In the schematic of FIG. 14B, five electrical receptacles are illustrated. In this arrangement, three intermediate receptacles are provided, with the middle receptacle having terminal groups at its input and output ends of the same type, namely terminal group D. In order to preserve the important feature of the present invention, namely the inability to connect more than the allotted number of receptacles, the ganging cables are limited in that their mating terminal groups 77 at their opposite ends cannot be interchangeable. Consequently, the ganging cables in this embodiment are limited to cables 75AB and 75CD.

In the arrangement of FIG. 14C, four electrical receptacles are connected. In this arrangement, the two intermediate receptacles have terminal groups BC and CB. Since none of the receptacles in FIG. 14C include interchangeable terminal groups, the cables can include a ganging cable that does have interchangeable mating terminal groups. Consequently, the arrangement of FIG. 14C includes a cable 75CC, together with the two cables 75AB.

Finally, in the embodiment of FIG. 14D, the single intermediate receptacle has interchangeable terminal groups B at its input and output openings. Again, as with the embodiment of FIG. 14B, the ganging cables cannot have the same mating terminal groups at their ends.

An analysis of the receptacle terminal group coding and the ganging cable mating terminal group coding reveals certain principles that are followed to achieve important functions of the present invention. These important functions include the paramount goal of preventing a consumer from adding additional electrical receptacles to the specific electrical system. Additional objectives include minimizing the number of different electrical receptacles and different ganging cables required, as well as providing an arrangement that can be easily assembled and disassembled as the articles of furniture are ganged or disconnected.

In order to achieve these objectives, certain sets of conditions must be met. In the first set of conditions, the kit of electrical receptacles and ganging cables can include no more than one cable having both connector ends configured for mating with the same terminal group. At the same time, no electrical receptacle can be provided that has terminal groups at its input and output openings that are interchangeable. An example of this condition is shown in FIGS. 14A and 14C, in which a single cable has like connector ends (namely connectors 75EE or 75CC). Likewise, none of the receptacles have terminal groups that are the same at its input and output ends.

A second set of conditions that can be derived is that no more than one receptacle can be provided that has two of the same terminal groups at its input and output ends. At the same time, no cable can be included in the kit in which its connector ends are configured for mating with the same terminal group. This condition is depicted in FIGS. 14B and 14D. In this arrangement, it can be seen that only one receptacle has the same terminal group at its input and output ends (DD and BB), while no ganging cable has the same mating terminal groups at its opposite ends.

Thus, kits providing electrical power for ganged furniture which will include an even number of electrical receptacles and an even number of sockets, must adhere to the first set of conditions centered around the single cable having like terminal groups at its ends. If the kit is providing power to an odd number of receptacles, then the second set of conditions are applied, namely that only one receptacle can be provided that has interchangeable terminal groups at its input and output openings. Applying either of these two sets of conditions will prevent unauthorized and improper connection of additional receptacles, and at the same time limit the number of different types of receptacles and ganging cables that are required for the kit.

The present invention, therefore, contemplates providing a kit to the consumer that includes the necessary electrical receptacles 10 and 10' and ganging cables 75 for the specific number of sockets. No more than six receptacles, each having two sockets, will be provided to a consumer, in view of the NEC and UL regulations limiting the number of sockets to twelve in a single electrical system, or thirteen if the wall socket is included in the count. In view of this restriction, a table arrangement such as that shown in FIG. 1 would require two electrical systems for each set of three ganged tables.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An electrical system for use with ganged furniture to provide electrical power to a number of devices associated with the ganged furniture, comprising:

a plurality of electrical receptacles, at least one mounted within an article of furniture, each of said plurality of electrical receptacles having at least one electrical socket for making an electrical connection with a device, said plurality of receptacles including;

an initial receptacle mounted within a first article of furniture and having a power cord substantially permanently electrically connected at one end thereof with said initial receptacle, said power cord having means at its opposite end for making an electrical connection to a power source separate from the electrical system, said initial receptacle having an initial terminal group for making removable electrical connection to a subsequent one of said plurality of electrical receptacles, wherein said power cord is in electrical communication with said at least one electrical socket of said initial receptacle and with said initial terminal group;

a last receptacle having a last terminal group for making removable electrical connection only to a previous one of said plurality of electrical receptacles, said last terminal group being in electrical communication with said at least one electrical socket of said last receptacle; and at least one intermediate receptacle having a first terminal group for making removable electrical connection with a sequentially previous one of said plurality of electrical receptacles and a second terminal group for making removable electrical connection with a sequentially subsequent one of said plurality of electrical receptacles, said first and second terminal groups being electrically connected within said intermediate receptacle and said first terminal group being electrically connected to said at least one electrical socket, wherein said first terminal group and said second terminal group are not interchangeable with either of said initial terminal group or said last terminal group; and a plurality of electrical cables, one each for making electrical connection between successive pairs of said plurality of electrical receptacles, at least one of said electrical cables having a first connector end configured for mating connection only with said initial terminal group and an opposite second connector end configured for mating connection only with either of said first or second terminal groups.

2. The electrical system according to claim 1, wherein said plurality of electrical receptacles includes:

one intermediate receptacle sequentially subsequent initial receptacle; and another intermediate receptacle sequentially prior to said last receptacle, and wherein said first terminal group of said one intermediate receptacle is the same as said second terminal group of said another intermediate receptacle, and said second terminal group of said one intermediate receptacle is the same as said first terminal group of said another intermediate receptacle.

3. The electrical system according to claim 2, wherein:

said initial terminal group and said last terminal group are interchangeable;

said plurality of electrical receptacles includes a further intermediate receptacle disposed between said one intermediate and said another intermediate receptacle, said further intermediate receptacle having opposite terminal groups that are identical and that are not interchangeable with any of said initial, last, first or second terminal groups; and said plurality of electrical cables include;

two cables having one connector end configured for mating connection only with said initial terminal group and an opposite connector end configured for mating only with said first terminal group; and two cables having one connector end configured for mating connection only with said second terminal group and an opposite connector end configured for mating only with said identical terminal groups of said further intermediate receptacle.

4. The electrical system according to claim 2, wherein:

said initial terminal group and said last terminal group are interchangeable;

said plurality of electrical receptacles includes two further intermediate receptacles disposed between said one intermediate and said another intermediate receptacle, said two further intermediate receptacles having opposite terminal groups that are mirror images of each other and that are not interchangeable with each other or with any of said initial, last, first or second terminal groups; and said plurality of electrical cables include;

two cables having one connector end configured for mating connection only with said initial terminal group and an opposite connector end configured for mating only with said first terminal group; and two cables having one connector end configured for mating connection only with said second terminal group and an opposite connector end configured for mating only with one of said opposite terminal groups of said further intermediate receptacle; and one cable having identical opposite connector ends configured for mating connection only with the other of said opposite terminal groups of said further intermediate receptacle.

5. An electrical system for use with ganged articles of furniture to provide electrical power to a number of devices associated with the ganged furniture, comprising:

an initial electrical receptacle mounted within a first article of furniture and having a power cord substantially permanently electrically connected therewith, said power cord having a plug end for making electrical connection to a source of electrical power separate form said electrical system, said initial electrical receptacle having at least one socket and an initial terminal group in electrical connection with said power cord within said initial receptacle;

a last electrical receptacle mounted within a last article of furniture and having only a last terminal group for electrical connection outside of said last electrical receptacle, said last receptacle further including at least one socket in electrical connection with said last terminal group within said last receptacle;

at least one intermediate electrical receptacle mounted within at least one intermediate article of furniture and having a first terminal group, a second terminal group in electrical communication with said first terminal group within said intermediate electrical receptacle, and at least one socket in electrical connection with said first terminal group within said intermediate receptacle, wherein neither of said initial terminal group nor last terminal group is interchangeable with either of said first terminal group or said second terminal group; and a plurality of electrical cables numbering one more than the number of intermediate receptacles, including;

an initial electrical cable having one connector end configured for mating only with said initial terminal group and an opposite connector end configured for mating only with either said first or second terminal group;

a final electrical cable having one connector end configured for mating only with either said first or second terminal group and an opposite connector end configured for mating only with said final terminal group; and an intermediate electrical cable having one connector end configured for mating only with either said first or second terminal group and an opposite connector end configured for mating only with either said first or second terminal group.

6. An electrical system for use with a plurality of ganged articles of furniture to provide electrical power to a number of devices associated with the ganged furniture, comprising:

no more than twelve electrical sockets mounted within no more than six electrical receptacles, in which each receptacle has no more than two sockets;

each of said electrical receptacles having means for supporting the receptacle in one of the ganged articles of furniture;

a first one of said electrical receptacles having a power cord substantially permanently electrically connected to the no more than two sockets in said first one of said receptacles and a first terminal group electrically connected to said power cord;

a last one of said electrical receptacles having only one last terminal group electrically connected to the no more than two sockets in said last one of said electrical receptacles;

no more than four intermediate electrical receptacles, each having an input terminal group and an output terminal group, said input terminal group being electrically connected to the no more than two sockets in said intermediate receptacle and electrically connected to said output terminal group;

a first electrical cable having one end configured for making electrical connection with only said first terminal group and an opposite end configured for making electrical connection with only said input terminal group of a next adjacent one of said intermediate electrical receptacles;

a last electrical cable having one end configured for making electrical connection with only said last terminal group and an opposite end configured for making electrical connection with only said output terminal group of a prior adjacent one of said intermediate electrical receptacles;

no more than three intermediate electrical cables, each having one end configured for making electrical connection with only said input terminal group or said output terminal group, and an opposite end configured for making electrical connection with only said input terminal group or said output terminal group;

wherein neither of said first terminal group and last terminal group is interchangeable with either of said input terminal group and output terminal group.

7. A kit for providing electrical power to a plurality of ganged articles of furniture configured to restrict the number of available electrical sockets to twelve or less, the kit comprising:

at least three electrical receptacles each having means for mounting on one of the articles of furniture, each including no more than two electrical sockets and no more than two electrical connection members, said electrical sockets being electrically connected to one of said connection members, wherein the electrical connection members for each of said receptacles are selected from the group including a power cord having a plug end for making electrical connection to a source of electrical power, a first terminal group, and at least two non-interchangeable intermediate terminal groups; and a plurality of electrical cables including at least one cable having one connector end configured for mating with said first terminal group and an opposite connector end configured for mating with one of said intermediate terminal groups, wherein the kit includes either (a) no more than one cable having both connector ends configured for mating with the same one of said connection members selected from said group and no electrical receptacle having two of the same connection members selected from said group, or (b) no more than one receptacle having two of the same connection members selected from said group and no cable having both connector ends configured for mating with the same connection member selected from said group.

8. The kit according to claim 7, including:

an initial electrical receptacle including said power cord and said first terminal group A;

a last electrical receptacle including only said first terminal group A;

two intermediate receptacles each including two electrical connection members, one having a terminal group B and the other having a terminal group C;

two electrical cables having one connector end configured for mating with only said first terminal group A and an opposite connector end configured for mating only with said terminal group B; and only one electrical cable having opposite connector ends both configured for mating only with said terminal group C.

9. The kit according to claim 7, including:

an initial electrical receptacle including said power cord and said first terminal group A;

a last electrical receptacle including only said first terminal group A;

two intermediate receptacles each including two electrical connection members, one having a terminal group B and the other having a terminal group C;

two additional intermediate receptacles each including two electrical connection members, one having a terminal group D and the other having a terminal group E;

two electrical cables having one connector end configured for mating with only said first terminal group A and an opposite connector end configured for mating only with said terminal group B;

two electrical cables having one connector end configured for mating with only said terminal group C and an opposite connector end configured for mating only with said terminal group D; and only one electrical cable having opposite connector ends both configured for mating only with said terminal group E.

* * * * *